(12) United States Patent
Sugita et al.

(10) Patent No.: US 12,350,911 B2
(45) Date of Patent: Jul. 8, 2025

(54) STAINABLE DECORATIVE SHEET AND METHOD OF STAINING DECORATIVE SHEET

(71) Applicant: DAI NIPPON PRINTING CO., LTD., Tokyo (JP)

(72) Inventors: Natsuo Sugita, Tokyo (JP); Takaho Saito, Tokyo (JP); Kouki Fujii, Tokyo (JP); Kosuke Nakai, Yokohama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 108 days.

(21) Appl. No.: 17/762,656

(22) PCT Filed: Sep. 25, 2020

(86) PCT No.: PCT/JP2020/036434
§ 371 (c)(1),
(2) Date: May 10, 2022

(87) PCT Pub. No.: WO2021/065747
PCT Pub. Date: Apr. 8, 2021

(65) Prior Publication Data
US 2022/0332101 A1    Oct. 20, 2022

(30) Foreign Application Priority Data

Sep. 30, 2019  (JP) .................................. 2019-180057
Sep. 17, 2020  (JP) .................................. 2020-156584

(51) Int. Cl.
*B32B 29/02*    (2006.01)
*B32B 5/02*     (2006.01)
(Continued)

(52) U.S. Cl.
CPC .............. *B32B 29/02* (2013.01); *B32B 5/022* (2013.01); *B32B 7/12* (2013.01); *D06M 15/263* (2013.01);
(Continued)

(58) Field of Classification Search
CPC .......... B32B 5/022; B32B 7/12; B32B 29/00; B32B 29/02; B32B 27/10; B32B 2255/02;
(Continued)

(56) References Cited

U.S. PATENT DOCUMENTS 5,827,788 A      10/1998  Miyakoshi
2017/0129206 A1*  5/2017  Yoshida .................... B32B 5/08

FOREIGN PATENT DOCUMENTS

GB    1 328 634 A    8/1973
JP    S53-009860 A   1/1978
(Continued)

OTHER PUBLICATIONS

Machine translation of JP 2019-064131 via EPO (Year: 2019).*
(Continued)

*Primary Examiner* — Laura C Powers
*Assistant Examiner* — Rebecca L Grusby
(74) *Attorney, Agent, or Firm* — Oliff PLC (57) ABSTRACT

A stainable decorative sheet having good adhesion between a paper base material and a nonwoven fabric with a surface excellent in tactile sensation and stainability, excellent transparency, and a method for coloring the stainable decorative sheet. The stainable decorative sheet includes a paper base material, an adhesive layer, a nonwoven fabric layer, and a transparency improving layer in a predetermined structure, wherein the nonwoven fabric layer partially has a filling part A and a filling part B in a part of voids among fibers of the nonwoven fabric layer.

10 Claims, 1 Drawing Sheet

(51) Int. Cl.
  *B32B 7/12* (2006.01)
  *D06M 15/263* (2006.01)
  *D06M 101/08* (2006.01)
  *D21H 27/18* (2006.01)
  *E04F 13/00* (2006.01)

(52) U.S. Cl.
  CPC ............ *D21H 27/18* (2013.01); *E04F 13/002* (2013.01); *B32B 2255/12* (2013.01); *B32B 2255/26* (2013.01); *B32B 2255/28* (2013.01); *B32B 2260/021* (2013.01); *B32B 2260/046* (2013.01); *B32B 2262/04* (2013.01); *B32B 2307/4026* (2013.01); *B32B 2307/412* (2013.01); *B32B 2307/718* (2013.01); *B32B 2307/732* (2013.01); *B32B 2419/00* (2013.01); *B32B 2605/00* (2013.01); *D06M 2101/08* (2013.01)

(58) Field of Classification Search
  CPC ............ B32B 2255/12; B32B 2255/26; B32B 2260/021; B32B 2260/046; B32B 2262/144; B32B 2419/00; B32B 2451/00; B32B 2605/00; B32B 2605/003; B32B 2607/02; D06M 15/263; D21H 27/18
  See application file for complete search history.

(56) References Cited

FOREIGN PATENT DOCUMENTS

| | | | | |
|---|---|---|---|---|
| JP | H05148371 | A | * | 6/1993 |
| JP | H09-226087 | A | | 9/1997 |
| JP | H09-262934 | A | | 10/1997 |
| JP | H10-029273 | A | | 2/1998 |
| JP | H10131097 | A | * | 5/1998 |
| JP | H11-179852 | A | | 7/1999 |
| JP | 2003127288 | A | * | 5/2003 |
| JP | 2003286699 | A | * | 10/2003 |
| JP | 2004060061 | A | * | 2/2004 |
| JP | 2019-064131 | A | | 4/2019 |
| WO | 98/43821 | A1 | | 10/1998 |

OTHER PUBLICATIONS

Machine translation of JP 2003-127288 via EPO (Year: 2003).*
Machine translation of JP 2003-286699 via EPO (Year: 2003).*
Machine translation of JP 2004-060061 via EPO (Year: 2004).*
Machine translation of JP H05148371 via EPO (Year: 1993).*
Machine translation of JP H10131097 via EPO (Year: 1998).*
Nov. 10, 2020 Search Report issued in International Patent Application No. PCT/JP2020/036434.
Sep. 21, 2023 Exended Search Report issued in European Patent Application No. 20872756.0.

* cited by examiner

STAINABLE DECORATIVE SHEET AND METHOD OF STAINING DECORATIVE SHEET

TECHNICAL FIELD

The present invention relates to a stainable decorative sheet and a method for coloring decorative sheets.

BACKGROUND ART

Mainly in Europe and the United States, it is a common practice for general consumers to apply a stain paint to the surface of building interior material made of wood, the surface of furniture surface material, the surface of furniture made of wood, etc., by themselves (DIY: Do It Yourself). Such a stain paint penetrates into the wood for coloring without covering wood grains of the wood itself or without forming a film on the surface, so that the design appearance unique to the wood such as wood grains and glaze (pearly luster) can be utilized.

In recent years, as building interior material, furniture surface material, etc., a structure in which a decorative sheet having a printed wood grain pattern is laminated on the surface of a sheet-like base material has also come to be used instead of natural wood, and decorative sheets that can be used for stain paint coating (hereinafter, also referred to as "stainable decorative sheets") have been manufactured. Specifically, assuming that the purchaser himself applies a stain paint to obtain a desired texture, the stainable decorative sheet is subjected to a surface treatment for ensuring the stain paint receptivity.

As such a decorative sheet, a decorative sheet for recoating made by printing a picture layer on a polyvinyl chloride (PVC) resin base material, which is then thermally fused to a nonwoven fabric, has been proposed (for example, refer to Patent Literature 1). The decorative sheet for recoating can be recoated or stain-coated, and the surface is provided with fine irregularities by the nonwoven fabric to obtain a tactile sensation very similar to that of wood, which is favored by consumers.

CITATION LIST

Patent Literature

PTL1: JP 09-262934 A

SUMMARY OF INVENTION

Technical Problem

However, in the case of using a PVC base material as the base material, a problem is that the cost of the decorative sheet is increased. Further, in the case of using a PVC base material as the base material, an environmental problem of generation of a chlorine atom-containing gas such as hydrogen chloride (HCl) may occur in incineration for disposal.

Accordingly, in response to the above problem, it is conceivable to change the base material to a paper base material. However, due to the change, it is expected that various problems will occur.

For example, in laminating a nonwoven fabric on a paper base material, the paper base material and the nonwoven fabric do not adhere to each other. Accordingly, the method of adhering the paper base material and the nonwoven fabric becomes a problem. In the case of providing an adhesive layer between the paper base material and the nonwoven fabric to achieve adhesion, irregularities of the nonwoven fabric may be lost, which may cause a problem of losing the tactile sensation very similar to that of wood. On the other hand, in the case of utilizing irregularities of the nonwoven fabric too much, the tactile sensation is lost due to the fluffing of the nonwoven fabric, and resulting from the fluffing (irregularities of the surface) and the difference in the refractive index due to voids among the fibers that constitute the nonwoven fabric, the transparency of the decorative sheet is reduced, which may cause a problem of reduced designability.

In the case of the decorative sheet having the base material changed to a paper base material, it is difficult to achieve a good balance between water resistance and solvent resistance. The medium of the stain paint (solvent, alcohol, etc.) permeates the paper base material to cause degradation of physical properties of the decorative sheet in some cases. Therefore, it is difficult to balance ensuring the physical properties such as strength, mass, and flexibility of the decorative sheet, and achieving coating suitability ("stainability") for ensuring the permeability and receptivity for colorants such as water-based stain paints and oil-based stain paints.

In view of the above problem, it is an object of the present invention to provide a stainable decorative sheet having good adhesion between a paper base material and a nonwoven fabric, with a surface excellent in tactile sensation and stainability, and also having excellent transparency, and a method for coloring the stainable decorative sheet.

Solution to Problem

Through extensive study, the present inventors have found that the problem can be solved by a stainable decorative sheet having the following structure.

1. A stainable decorative sheet comprising a paper base material, an adhesive layer disposed on at least one surface side of the paper base material, a nonwoven fabric layer disposed on a surface side of the adhesive layer other than the surface on which the paper base material is disposed, and a transparency improving layer disposed on a surface side of the nonwoven fabric layer other than the surface on which the adhesive layer is disposed, wherein the nonwoven fabric layer partially has a filling area A, in which a part of the voids of the fibers constituting the nonwoven fabric layer is filled with the resin forming the adhesive layer on the side where the adhesive layer is provided in the thickness direction of the nonwoven layer, and a filling area B, in which a part of the voids of the fibers constituting the nonwoven fabric layer is filled with the resin forming the transparent improving layer on the side where the transparent improving layer is provided in the thickness direction of the nonwoven layer.

2. The stainable decorative sheet according to item 1, wherein the nonwoven fabric layer is made of at least one fiber selected from a thermoplastic resin fiber and a regenerated fiber.

3. The stainable decorative sheet according to item 1 or 2, wherein the resin forming the adhesive layer is at least one resin selected from a urethane resin and a polyolefin resin.

4. The stainable decorative sheet according to any one of items 1 to 3, wherein the resin forming the transparency improving layer is at least one resin selected from an acrylic resin, an acrylic polyol resin and a urethane resin.

5. The stainable decorative sheet according to any one of items 1 to 4, further comprising a decorative layer between the paper base material and the adhesive layer.

6. The stainable decorative sheet according to item 5, wherein the decorative layer exhibits a wood grain pattern.

7. A method for coloring a decorative sheet, comprising applying a colorant to the transparency improving layer side of the stainable decorative sheet according to any one of items 1 to 6 to color the nonwoven fabric layer.

Advantageous Effects of Invention

According to the present invention, a stainable decorative sheet having good adhesion between a paper base material and a nonwoven fabric, with a surface excellent in tactile sensation and stainability, and also having excellent transparency, and a method for coloring the stainable decorative sheet, can be provided.

DESCRIPTION OF EMBODIMENT

Hereinafter, an embodiment of the present invention (hereinafter, may be referred to as "the present embodiment") will be described. Incidentally, in the present specification, the numerical values involved in terms "or more", "or less" and "to" for describing a numerical range are numerical values combined in any way, and the numerical values in Examples are numerical values which may be used as the upper and lower limits of the numerical range.

[Stainable Decorative Sheet]

A stainable decorative sheet in the present embodiment comprises a paper base material, an adhesive layer disposed on at least one surface side of the paper base material, a nonwoven fabric layer disposed on a surface side of the adhesive layer other than the surface on which the paper base material is disposed, and a transparency improving layer disposed on a surface side of the nonwoven fabric layer other than the surface on which the adhesive layer is disposed, wherein the nonwoven fabric layer partially has a filling area A, in which a part of the voids of the fibers constituting the nonwoven fabric layer is filled with the resin forming the adhesive layer on the side where the adhesive layer is provided in the thickness direction of the nonwoven layer, and a filling area B, in which a part of the voids of the fibers constituting the nonwoven fabric layer is filled with the resin forming the transparent improving layer on the side where the transparent improving layer is provided in the thickness direction of the nonwoven layer.

By having the structure described above, the stainable decorative sheet in the present embodiment exhibits effects of having good adhesion between a paper base material and a nonwoven fabric, with a surface excellent in tactile sensation and stainability, and also having excellent transparency. In order to obtain these effects, the filling part A formed from the adhesive layer and the nonwoven fabric layer, and the filling part B formed from the transparent resin layer and the nonwoven fabric layer, in particular, play an important role.

It can be said that the nonwoven fabric layer is a layer having two filling parts A and B in relation to the adhesive layer and the transparent resin layer. Since the filling part A is formed by permeation of at least a part of the resin forming the adhesive layer into the nonwoven fabric layer, excellent adhesion between the paper base material and the nonwoven fabric layer can be obtained. On the other hand, the filling part B is formed by permeation of at least a part of the resin forming the transparency improving layer into the nonwoven fabric layer. Accordingly, while imparting the tactile sensation and the stainability through improvement in the fluffing conditions of the nonwoven fabric layer together with the transparent protective layer, reduction in transparency due to the fluffing (irregularities on the surface) and refractive index of voids of the nonwoven fabric layer is suppressed to obtain excellent designability.

The stainable decorative sheet of the present embodiment will be described below with reference to the drawings. In the description of the following drawings, the same or similar parts are represented by the same or similar reference symbols. However, the drawings are schematic, and the relationship between the thickness and the plane dimensions, the ratio of the thickness of each layer, etc. are different from the actual ones. Accordingly, the specific thickness and dimensions are determined by checking the following explanations. Certainly, the drawings include parts having different dimensional relationships and ratios from each other.

Figure 1:
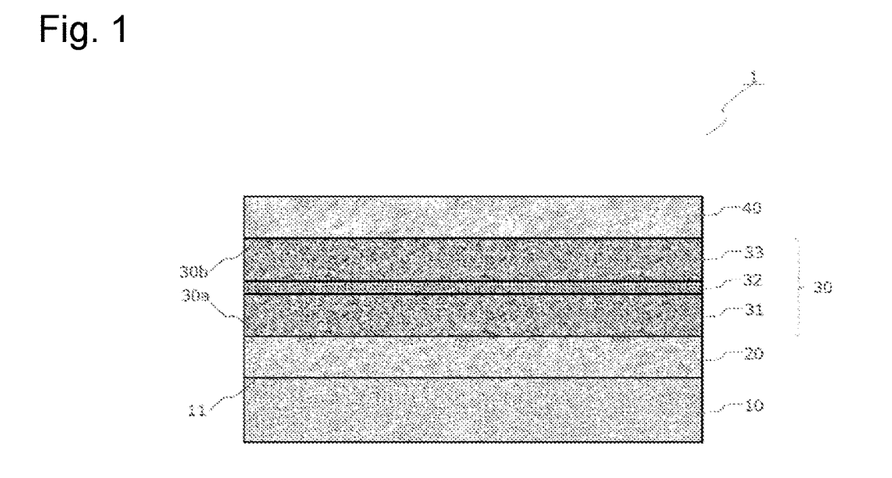
FIG. 1 is a schematic cross-sectional view showing a stainable decorative sheet in an embodiment.

In FIG. 1, it is shown that a stainable decorative sheet 1 comprises a paper base material 10, an adhesive layer 20 disposed on at least one surface 11 side of the paper base material 10, a nonwoven fabric layer 30 disposed on a surface side of the adhesive layer 20 other than the surface on which the paper base material 10 is disposed, and a transparency improving layer 40 disposed on a surface side of the nonwoven fabric layer 30 other than the surface on which the adhesive layer 20 is disposed. It is also shown that the nonwoven fabric layer 30 of the stainable decorative sheet 1 in the present embodiment partially has a filling part A 31 filled with a resin forming the adhesive layer 20 in a part of voids among fibers of the nonwoven fabric layer 30 on a surface 30a side on which the adhesive layer 20 is disposed in the thickness direction of the layer, and a filling part B 33 filled with a resin forming the transparency improving layer 40 in a part of voids among fibers of the nonwoven fabric layer 30 on the surface 30b side on which the transparency improving layer 40 is disposed in the thickness direction of the layer.

Figure 2:
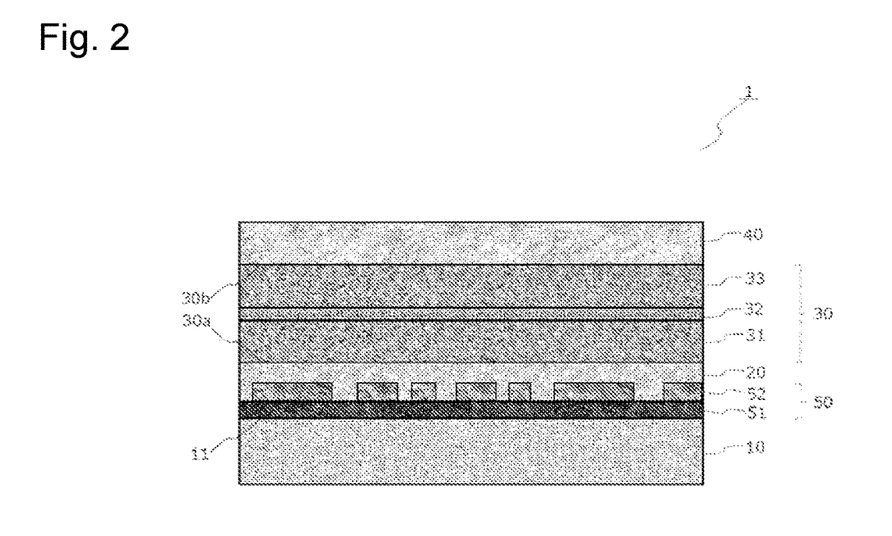
FIG. 2 is a schematic cross-sectional view showing a stainable decorative sheet in an embodiment.

In FIG. 2, it is shown that the stainable decorative sheet 1 shown in FIG. 1 further has a decorative layer 50 including an overall colored layer 51 and a picture layer 52. Further, in FIG. 3, a stainable decorative sheet 1 having the same layer structure as in FIG. 2 is shown, such that and the state of the nonwoven fabric layer 30, the state of the filling part A31 present between the nonwoven fabric layer 30 and the adhesive layer 20, and the state of the filling part B33 present between the nonwoven fabric layer 30 and the transparency improving layer 40 are illustrated more in line with the actual nonwoven fabric.

(Paper Base Material 10)

As the stainable decorative sheet 1 in the present embodiment, a paper base material is adopted from the viewpoints of cost reduction and environmental problems. The paper base material 10 functions as a support for disposing another layer in the stainable decorative sheet 1 of the present embodiment.

Examples of the base material used for the paper base material 10 include woodfree paper, tissue paper, linter paper, kraft paper, interpaper reinforcing paper, resin-impregnated paper, backing paper for wallpaper, and flame retardant paper made of the above paper mixed or impregnated with a flame retardant. These materials may be used alone, or may be laminated in any combination such as a laminate of paper sheets.

To the paper base material 10, an additive such as a flame retardant, an inorganic agent, a dry paper strengthening agent, a wet paper strengthening agent, a colorant, a sizing agent and a fixing agent may be appropriately added on an as needed basis.

The thickness of the paper base material 10 is evaluated based on the basis weight (mass per unit area) for expression. The thickness (that is, basis weight) is not particularly limited. In consideration of durability and ease of handling of the decorative sheet, the basis weight is preferably in the range of 20 g/m$^2$ or more and 150 g/m$^2$ or less, more preferably in the range of 25 g/m$^2$ or more and 120 g/m$^2$ or less, still more preferably in the range of 35 g/m$^2$ or more and 100 g/m$^2$ or less, and furthermore preferably in the range of 40 g/m$^2$ or more and 60 g/m$^2$ or less.

(Adhesive Layer 20)

The adhesive layer 20 is a layer disposed on at least one surface 11 side of the paper base material 10, and is a layer disposed for adhesion between the paper base material 10 and the nonwoven fabric layer 30.

The adhesive used for the adhesive layer 20 is not particularly limited, and an adhesive made of various resins may be used. Examples of the resin forming the adhesive include a urethane resin, a polyolefin resin, an acrylic resin, and an epoxy resin, and these resins may be used alone or in combination of two or more. In particular, a urethane resin and a polyolefin resin are preferred, and a urethane resin is more preferred. Use of these resins suppresses the penetration of the medium (solvent, alcohol) of the stain paint applied to the nonwoven fabric layer 30 from permeating the paper base material 10 so as to easily maintain physical properties such as the strength, mass and flexibility of the stainable decorative sheet 1, while achieving excellent adhesion.

As the urethane resin, any one of a thermoplastic urethane resin and a curable urethane resin may be used, and it is preferable to use a curable urethane resin from the viewpoint of improving the adhesive strength between the paper base material and the nonwoven fabric layer. On the other hand, focusing on the materials, time required for completion of adhesion, production cost, etc., while ensuring the adhesive strength between the paper base material and the nonwoven fabric layer, use of a thermoplastic urethane resin, which has features including a relatively short time required for completion of adhesion at relatively low cost, is preferred.

The curable urethane resin may be any one of a two-component curable type and a one-component curable type, and a two-component curable urethane resin is preferred from the viewpoint of adhesion.

The two-component curable urethane resin is a urethane resin containing a polyol as main component and a polyisocyanate as cross-linking agent (curing agent). The polyol is a compound having two or more hydroxyl groups in a molecule, and examples thereof include polyethylene glycol, polypropylene glycol, acrylic polyol, polyester polyol, polyether polyol, polycarbonate polyol, polycaprolactone polyol, and urethane polyol. Further, the polyisocyanate is a compound having two or more isocyanate groups in a molecule, and examples thereof include an aromatic isocyanates such as 2,4-tolylene diisocyanate, xylene diisocyanate, naphthalene diisocyanate and 4,4'-diphenylmethane diisocyanate, and an aliphatic (or alicyclic) isocyanate such as 1,6-hexamethylene diisocyanate, 2,2,4-trimethylhexamethylene diisocyanate, isophorone diisocyanate, hydrogenated tolylene diisocyanate, and hydrogenated diphenylmethane diisocyanate. Further, examples of the polyisocyanate include an adduct or a multimer of the various polyisocyanates described above such as an adduct of tolylene diisocyanate and a trimer of tolylene diisocyanate.

The thermoplastic urethane resin is a copolymer obtained by copolymerizing monomers through a urethane bond formed by condensing a compound having an isocyanate group and a hydroxyl group such as alcohol group. As described above, use of the thermoplastic urethane resin for formation of an adhesive layer improves the stainability, in particular. A thermoplastic urethane resin has a high wetting tension, and specifically, the wetting tension easily tends to be 70 mN/m or more. It is presumed that since the wetting tension of the adhesive layer is easily increased, the paint receptivity is improved to improve the stainability. Focusing on the improvement of stainability, the wetting tension of the adhesive layer (wetting tension of the resin forming the adhesive layer) is therefore preferably 70 mN/m or more. In the present specification, the wetting tension is measured by the method described in Examples described below.

From the viewpoint of improving the stainability through increase of the wetting tension of the adhesive layer, it is preferable that the thermoplastic urethane resin have a desired wetting tension through adjustment, which is performed by adjusting properties having large effect on the wetting tension such as the number of functional groups and the abundance ratio of urethane bond in a molecule, and by selecting the polyol to constitute the urethane resin in consideration of the hydroxyl number (for example, the hydroxyl number which the resin containing a large amount of hydroxyl groups has, as described later), etc. From the same viewpoint as this, the glass transition point of the thermoplastic urethane resin is preferably −60° C. or more and 50° C. or less, more preferably −55° C. or more and 20° C. or less, and still more preferably −50° C. or more and 0° C. or less.

Examples of the polyolefin resin include those containing one or more monoolefins such as ethylene, propylene, butene, pentene, hexene, heptene, octene, and 4-methyl-1-pentene as a monomer unit, and further, those containing a monomer unit other than monoolefins including alicyclic olefins such as cyclopentene and cyclohexene, chain or cyclic olefins such as 1,4-hexadiene, 1,5-hexadiene, divinylbenzene, 1,3-cyclopentadiene, 1,3-cyclohexadiene, and 5-vinyl-2-norbornene, and aromatic vinyl compounds such as styrene and substituted styrene.

It is preferable that the polyolefin resin be a polyethylene resin containing ethylene as a monomer unit from the viewpoint of adhesiveness to the paper base material 10 and the nonwoven fabric layer 30.

In the case of using a urethane resin or a polyolefin resin, the ratio of the urethane resin or the polyolefin resin relative to the total resin of the adhesive layer 20 is preferably 50% or more, more preferably 70% or more, and more preferably 90% or more, and most preferably 100%.

In the present embodiment, the resin forming the adhesive layer 20 may be used as a resin composition in which additives such as a weather resistant agent including an ultraviolet absorber and a light stabilizer, an extender pigment, a solvent, a stabilizer, and a plasticizer are appropriately mixed. That is, the adhesive layer 20 may be formed from a resin composition containing an additive in addition to the resin described above.

The thickness of the adhesive layer 20 may vary depending on the materials of the paper base material 10 and the nonwoven fabric layer 30, the thickness of the nonwoven fabric layer 30, etc., so that it is difficult to unconditionally specify a numerical value of the thickness. For example, from the viewpoint of adhesion between the paper base material 10 and the nonwoven fabric layer 30, and well-balanced formation of the filling part A31, the filling part B33 and the fiber part 32 for well-balanced improvement in the stainability and transparency, and also from the viewpoint of imparting water resistance and solvent resistance, the total thickness of the adhesive layer 20 and the filling part A31 is preferably 3 µm or more, more preferably 5 µm or more, still more preferably 8 µm or more, furthermore preferably 10 µm or more, and the upper limit is less than the thickness of the nonwoven fabric layer 30, preferably 30 µm or less, more preferably 27 µm or less, still more preferably 23 µm or less, furthermore preferably 20 µm or less. The total thickness of the adhesive layer 20 and the filling part A31 is an average value of the thicknesses measured at any 30 points in a cross-sectional image photographed by using various electron microscopes such as a transmission electron microscope (TEM), a scanning electron microscope (SEM), and a scanning transmission electron microscope (STEM).

(Nonwoven Fabric Layer 30)

The nonwoven fabric layer 30 is a layer that ensures paint receptivity for a colorant such as water-based stain paint and oil-based stain paint to penetrate voids among the fibers that form the nonwoven fabric layer 30 (fiber part 32), such that the stainability is exhibited. The nonwoven fabric layer 30 partially has a filling part A31 filled with a resin forming the adhesive layer 20 in a part of voids among fibers of the nonwoven fabric layer 30 on a surface 30a side on which the adhesive layer 20 is disposed in the thickness direction of the layer, and a filling part B33 filled with a resin forming the transparency improving layer 40 in a part of voids among fibers of the nonwoven fabric layer 30 on the surface 30b side on which the transparency improving layer 40 is disposed in the thickness direction.

Examples of the fibers that constitute the nonwoven fabric layer 30 include thermoplastic resin fibers, natural fibers, regenerated fibers, and semi-synthetic fibers, and from the viewpoint of stainability, thermoplastic resin fibers and regenerated fibers are preferred. In the present embodiment, the fibers may be used alone or in combination of two or more.

Preferred examples of the thermoplastic resin fiber include a thermoplastic resin fiber made from a thermoplastic resin including a (meth)acrylic resin such as poly(meth)acrylic acid ester; a polyvinyl acetal (butyral resin) such as polyvinyl butyral; a polyester resin such as polyethylene terephthalate and polybutylene terephthalate; a polyolefin resin such as polyethylene and polypropylene; a styrene-based resin such as polystyrene and α-methylstyrene; an acetal resin such as polyoxymethylene; a thermoplastic elastomer such as a polyolefin-based thermoplastic elastomer, a polystyrene-based thermoplastic elastomer, a polydiene-based thermoplastic elastomer, a urethane-based thermoplastic elastomer, a polyester-based thermoplastic elastomer and a fluororesin-based thermoplastic elastomer; a vinyl chloride resin, a urethane resin, a fluororesin such as an ethylene-tetrafluoroethylene copolymer, a polyamide resin, a polyimide resin, a polylactic acid resin, a polycarbonate resin, a polyvinyl acetal resin and a liquid crystal polyester resin. Among these thermoplastic resin fibers, in consideration of morphological stability, a thermoplastic resin fiber made from a resin such as a polyester resin, a polyolefin resin, or a urethane resin is preferred, and a thermoplastic resin made from a polyester resin or a polyolefin resin is preferred.

In the present embodiment, the thermoplastic resins that constitute the thermoplastic resin fiber may be alone or in a combination of two or more. For example, the fiber may be a composite fiber having a double structure with a core made of polyester resin and a sheath made of polyolefin resin.

Examples of the natural fibers include fibers made of natural materials such as cotton, wool, and silk, and examples of the regenerated fibers include rayon (also referred to as artificial silk), cupra (also referred to as cuprammonium rayon), and lyocell, and examples of the semi-synthetic fibers include triacetate and promix.

Among the fibers described above, fibers having a large number of hydroxyl groups are preferred, and for example, regenerated fibers, particularly rayon fibers are preferred. Fibers having a large number of hydroxyl groups have a high wetting tension (specifically, 70 mN/m or more), so that the wetting tension of the nonwoven fabric is easily increased. Accordingly, the paint receptivity for the stain paint is improved, so that the stainability can be improved. Focusing on the improvement of stainability, the wetting tension of the nonwoven fabric layer (wetting tension of the resin of the adhesive layer) is therefore preferably 70 mN/m or more.

The fiber diameter of the fibers that constitute the nonwoven fabric layer 30 is not particularly limited. In particular consideration of the tactile sensation, it is preferable that the nonwoven fabric have an average fiber diameter of preferably 0.5 µm or more, more preferably 1 µm or more, with an upper limit of preferably 50 µm or less, more preferably 30 µm or less, and still more preferably 20 µm or less. The nonwoven fabric made of fibers having an average fiber diameter in the range tends to have a tactile sensation very similar to that of wood.

The average fiber diameter of the fibers that constitute the nonwoven fabric can be measured by measuring the width (diameter) of 30 fibers present at any place of the nonwoven fabric using an electron microscope (magnification: 300) and averaging the measurement result values.

The fibers that constitute the nonwoven fabric layer 30 can be formed by, for example, forming a fleece by a spunbond method and bonding the formed fleece by a thermal bond method, a spun lace method (hydroentanglement method), or the like. Further, the nonwoven fabric layer 30 formed by these methods tends to have a tactile sensation very similar to that of wood.

The basis weight of the fibers that constitute the nonwoven fabric layer 30 is not particularly limited, preferably 10 g/m$^2$ or more, more preferably 15 g/m$^2$ or more, having an upper limit of preferably 40 g/m$^2$ or less, more preferably 30 g/m$^2$ or less, still more preferably 20 g/m$^2$ or less, from the viewpoint of obtaining the strength of the nonwoven fabric layer 30.

The thickness of the nonwoven fabric layer 30 is not particularly limited, preferably 30 µm or more, more preferably 50 µm or more, still more preferably 60 µm or more, furthermore preferably 70 µm or more, having an upper limit of preferably 250 µm or less, more preferably 200 µm or less, still more preferably 150 µm or less, furthermore preferably 100 µm or less, in consideration of physical properties such as strength, mass, and flexibility of the stainable decorative sheet 1.

(Filling Part A31 and Filling Part B33)

On a surface 30a side where the adhesive layer 20 is disposed in the thickness direction of the nonwoven fabric layer 30, a filling part A31 filled with a resin forming the adhesive layer 20 is disposed in a part of voids among fibers. Due to having the filling part A31, the stainable decorative sheet 10 in the present embodiment can have good adhesion between the paper base material 10 and the nonwoven fabric layer 30, with improved transparency.

The filling portion A31 is in a state where voids among the fibers that form the nonwoven fabric layer 30 are filled with the resin forming the adhesive layer 20, so that no voids remain therein. Accordingly, the filling part A31 is a part having no paint receptivity that allows colorant such as a water-based stain paint and an oil-based stain paint penetrates.

On a surface 30b side where the transparency improving layer 40 is disposed in the thickness direction of the nonwoven fabric layer 30, a filling part B33 filled with a resin forming the transparency improving layer 40 is disposed in a part of voids among fibers. The presence of the filling part B33 suppresses reduction in transparency due to refractive index of voids of the fibers, so that excellent designability can be obtained.

Similar to the filling part A31, the filling part B33 is in a state where voids among the fibers forming the nonwoven fabric layer 30 are filled with the resin forming the transparency improving layer 40, so that no voids remain therein. Accordingly, the filling part B33 is a part having no paint receptivity that allows colorant such as a water-based stain paint and an oil-based stain paint penetrates.

In the stainable decorative sheet in the present embodiment, the nonwoven fabric layer 30 partially has the filling part A31 and the filling part B33. In other words, the nonwoven fabric layer 30 is required to have the following fiber part 32, which is a part other than the filling part A31 and the filling part B33. Without the fiber part 32 which is a part other than the filling parts, the stainability cannot be obtained, because the filling parts are in a state with no voids remaining, and do not have no paint receptivity that allows colorant such as a water-based stain paint and an oil-based stain paint penetrates.

In FIGS. 1 and 2 which are schematic cross-sectional views (conceptual views), the filling part A31 and the filling part B33 are schematically shown as if the entire surfaces are covered in a continuous layer form for convenience of illustration simplification and explanation of the layer structure concept. However, it is conceivable that the actual layer is not uniform as shown in the figure. Considering that a colorant such as water-based stain paint and oil-based stain paint penetrates through for coloration, for example, it is presumed that, in certain areas in the thickness direction of the nonwoven fabric layer 30 shown as the filling part A31 and the filling part B33 in the figure, a large number of minute regions of the filling part A31 and minute regions of the filling part B33, consisting of minute regions having the structure in which the voids of among fibers forming the nonwoven fabric layer 30 are filled with the resin forming the adhesive layer 20 and the resin forming the transparency improving layer 40, respectively, are discontinuously present or scattered in the state that a small amount of minute regions of the unfilled fiber part 32 are interposed therebetween.

Figure 3:
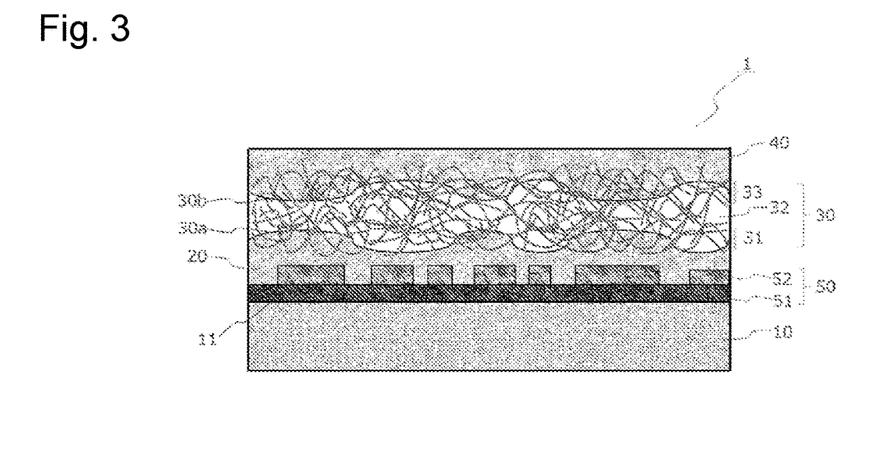
FIG. 3 is a schematic cross-sectional view showing a stainable decorative sheet in an embodiment.

Further, in both the filling part A and the filling part B, the resin gradually permeates into the inside of the nonwoven fabric layer 30 from the outer surface of the nonwoven fabric layer 30. Accordingly, depending on the adjustment of the processing conditions, as shown in FIG. 3, the nonwoven fabric layer 30 may have a three-layer structure including a filling part A31 located adjacent to the paper base material 20 (in which a fiber part 32 coexists among a plurality of minute areas of the filling part A), a filling part B33 on the opposite side of the paper base material 20 side (in which a fiber part 32 coexists among a plurality of minute areas of the filling part B), and a fiber part 32 sandwiched between these filling part A31 and the filling part B33 (voids among fibers are unfilled).

(Fiber Part 32)

As described above, the stainable decorative sheet of the present embodiment is a layer partially having a filling part A31 and a filling part B33, and therefore has a part other than these filling parts, that is, a fiber part 32. As shown in FIGS. 1 to 3 and particularly clearly shown in FIG. 3, the fiber part 32 is a part of the nonwoven fabric layer 30 where the fibers of the nonwoven fabric that form the fiber part 32 remain with voids remaining without filling with the resins that form the adhesive layer 20 and the transparency improving layer 40, respectively. Having the fiber part 32, the stainable decorative sheet of the present embodiment ensures the paint receptivity that allows colorants such as water-based stain paint and oil-based stain paint to enter voids among fibers, so that stainability can be exhibited.

The aspect of the fiber part 32 is not particularly limited as long as voids remains without filling with the resin forming the adhesive layer 20 or the transparency improving layer 40. Examples of the aspect include an aspect as shown in FIG. 3, in which the fibers exist as they are without entering of the resin of the adhesive layer 20 or the transparency improving layer 40 into voids among the fibers of the nonwoven fabric 30 at all, with voids existing among the fibers; and an aspect in which although the resins of the adhesive layer 20 and the transparency improving layer 40 enter to some extent, the fibers are coated with the resins, with voids existing in the coating resins. In the stainable decorative sheet of the present embodiment, the aspect of the fiber part 32 may be any thereof.

As described above, the fiber part 32 is a part not filled with the resins of the adhesive layer 20 and the transparency improving layer 40, that is a part other than the filling part A31 and the filling part B33. Although the fiber part 32 is schematically shown in FIGS. 1 and 2 in a layered form, it is more strictly not in a layered form because, as described above, it is presumed that the filling part A31 and the filling part B33 are actually continuously present or scattered in a certain area in the thickness direction of the nonwoven fabric layer 30 as shown in FIG. 3. Accordingly, it is presumed that the fiber part 32 is continuously present or scattered in a certain area in the thickness direction of the nonwoven fabric layer 30 as shown as the fiber part 32 in FIGS. 1 to 3.

Examples of the method of allowing the nonwoven fabric layer 30 to partially have the filling part A31 and the filling part B33 include a method of adjusting such as the coating amount of the resin composition used for forming the adhesive layer 20 and the coating amount of the resin composition used for forming the transparency improving layer 40. For example, with increase in the coating amount of the resin composition used for forming the adhesive layer 20, the proportion of the filling part A31 in the nonwoven fabric layer 30 increases, while with increase in the coating amount of the resin composition used for forming the transparency improving layer 40, the proportion of the filling part B33 in the nonwoven fabric layer 30 increases. Further, with increase in the coating amounts of the resin composition used for forming the adhesive layer 20 and the transparency improving layer 40, the proportion of the fiber part 32 in the nonwoven fabric layer 30 decreases, and with decrease in the coating amounts, the proportion of the fiber part 32 in the nonwoven fabric layer 30 increases.

In the present embodiment, for example, by adjusting the coating amount and the like, a desired state of the nonwoven fabric layer 30 can be obtained.

(Transparency Improving Layer 40)

The transparency improving layer 40 is a layer disposed on a surface 30b side which is another side of the nonwoven fabric layer 30 with an adhesive layer 20 on a surface 30a (that is, the front side of the decorative sheet 1). The transparency improving layer 40 controls fluffing of the nonwoven fabric layer 30, thereby reducing the fluffing (irregularities on the surface) and suppressing the loss of tactile sensation caused by the fluffing while ensuring the stainability of the decorative sheet. Further, the transparency improving layer 40 reduces the difference in the refractive index between the void and the fibers that constitute the nonwoven fabric layer 30, so that the transparency of the nonwoven fabric layer 30 observed from the other surface 30b side can be improved and the haze value can be reduced. As a result, the layer can not only improve the transparency of the stainable decorative sheet of the present embodiment but also impart tactile sensation and stainability.

As the resin forming the transparency improving layer 40, any one of a thermoplastic resin and a curable resin may be employed. Preferred examples thereof include an acrylic resin, a styrene resin, a polyester resin, a urethane resin, an epoxy resin, and a cellulose resin. Among them, an acrylic resin, an acrylic polyol resin, and a urethane resin are preferred from the viewpoint of improvement in designability resulting from improvement in transparency, and an acrylic resin and an acrylic polyol resin are more preferred. The curable resin may be a one-component curing type or a two-component curing type, and from the viewpoint of improving the stainability, the amount of the curing agent added is preferably 10 parts by mass or less, more preferably 8 parts by mass or less, relative to 100 parts by mass of the main agent. These resins may be used alone or in combination of two or more. Incidentally, in consideration of the load on the environment during combustion, a vinyl chloride resin is not preferred.

The resin forming the transparency improving layer 40 may be appropriately selected from the resins exemplified above. It is preferable that a resin having a high wetting tension (specifically, 70 mN/m or more), which easily increase the wetting tension of the transparency improving layer, be selected from the viewpoint of improving the stainability through improvement in the paint receptivity for the stain paint. Therefore, focusing on the improvement of stainability, the wetting tension of the transparency improving layer (wetting tension of the resin forming the transparency improving layer) is preferably 70 mN/m or more. A resin containing a large amount of hydroxyl groups tends to have a wetting tension of 70 mN/m or more. From such a viewpoint, for example, one having a hydroxyl number of 5 mg KOH/g or more, more preferably 10 mg KOH/g or more, still more preferably 15 mg KOH/g or more, furthermore preferably 20 mg KOH/g or more, with an upper limit of preferably 60 mg KOH/g or less, more preferably 55 mg KOH/g or less, still more preferably 50 mg KOH/g or less, furthermore preferably 45 mg KOH/g or less, is preferred. In the present specification, the hydroxyl number is measured based on JIS K1557-1:2007 (Plastics-Polyols for use in the production of polyurethane-Part 1: Determination of hydroxyl number). Further, the hydroxyl number may also be applied to the thermoplastic urethane resin described above.

Among the resins described above, as the type of resin, an acrylic polyol resin is preferred, and it is preferable to use an acrylic polyol resin and an isocyanate curing agent in combination.

In the present embodiment, from the viewpoint of improving the stainability, it is preferable that the adhesive layer 20 be made of a thermoplastic urethane resin having a wet tension of 70 mN/m or more, rayon fibers having a wet tension of 70 mN/m or more be used as fibers to constitute the nonwoven fabric layer 30, and a resin having a wetting tension of 70 mN/m or more be used as the resin forming the transparency improving layer 40.

Further, in the present embodiment, the resin forming the transparency improving layer 40 may be used as a resin composition in which additives such as a colorant including a pigment and a dye, a weather resistant agent including an ultraviolet absorber and a light stabilizer, an extender pigment, a solvent, a stabilizer, a plasticizer, a catalyst and a curing agent are appropriately mixed. That is, the transparency improving layer 40 may be formed from a resin composition containing an additive in addition to the resin described above.

As shown in FIGS. 1 to 3, the transparency improving layer 40 may be present in a layered form on the surface 30b with a certain thickness, or may be present to cover the outermost fibers along the surface 30b of the nonwoven fabric layer 30. The transparency improving layer 40 may be in any aspect. From the viewpoint of improving the transparency, tactile sensation and stainability, the transparency improving layer 40 may be present on at least a part of the surface of the front side of the decorative sheet, may be present to at least partially cover the outermost fibers, or may be present to cover the entire surface thereof.

In the case where the transparency improving layer 40 is present in a layered form, it is preferable that the layer 40 be present on a part of the surface of the stainable decorative sheet of the present embodiment, from the viewpoint of ensuring the paint receptivity for an entering colorant such as a water-based stain paint and an oil-based stain paint so as to obtain excellent stainability. Also, in the case where the layer 40 is present to cover the outermost fibers, it is preferable that voids formed by fibers be at least partially present in the outermost surface or in the vicinity thereof (in the vicinity in the thickness direction of the nonwoven fabric layer 30), from the viewpoint of ensuring the paint receptivity to obtain excellent stainability.

As described above, from the viewpoint of ensuring the paint receptivity for an entering colorant such as a water-based stain paint and an oil-based stain paint so as to obtain excellent stainability regardless of the aspect of the presence of the transparency improving layer 40, it is preferable that voids formed by fibers having a surface that may be covered with the resin be at least partially present in the outermost surface or in the vicinity thereof (in the vicinity in the intralayer thickness direction of the nonwoven fabric layer 30).

The thickness of the transparency improving layer 40 may be determined mainly in consideration of the thickness of the transparency improving layer 40 and the balance of the filling part B33, the fiber part 32 and the filling part A31 in the nonwoven fabric layer 30. From the viewpoint of forming the filling part A31, the filling part B33 and the fiber part 32 in a good balance and improving the tactile sensation, stainability and transparency of the surface in a good balance, the total thickness of the transparency improving layer 40 and the filling part B33 is preferably 0.5 µm or more, more preferably 1 µm or more, still more preferably 2 µm or more, and the upper limit is preferably 10 µm or less, more preferably 8 µm or less, still more preferably 6 µm or less. Incidentally, the total thickness of the transparency improving layer 40 and the filling part B33 is an average value measured by the same method as for the total thickness of the adhesive layer 20 and the filling part A31.

(Decorative Layer 50)

It is preferable that the stainable decorative sheet of the present embodiment have a decorative layer 50 from the viewpoint of improving the design. The decorative layer 50 may be disposed between the paper base material 10 and the nonwoven fabric layer 30, and is preferably disposed between the paper base material 10 and the adhesive layer 20.

The decorative layer 50 may be a layer made of an overall colored layer 51 alone so as to cover the entire surface thereof, a picture layer 52 alone so as to form a pattern for covering a part thereof, or a combination of the overall colored layer 51 and the picture layer 52. These layer structures may be determined according to a desired pattern.

The pattern imparted by the decorative layer 50 may be selected as desired without particular limitation, and examples thereof include a wood grain pattern, a marble pattern (for example, a travertine marble pattern), a stone grain pattern that imitates a rock surface such as cleavage plane of granite plate, a fabric pattern that imitates fabric grain or cloth-like pattern, a leather (leather grain) pattern that expresses a leather grain, a tiled pattern, a brick laying pattern, a hairline, hairline grooves, a satin finish, a sand texture, letters, symbols, a geometric pattern, a combination thereof such as a parquet and a patchwork pattern. Further, examples of patterns in which these are combined include an artificial stone in which crushed stone material such as marble is mixed with white cement, hardened, and polished to make a marble finish, that is, a pattern like so-called artificial marble.

Although the consumer demand for the design changes depending on the trend and the like, a wood grain pattern has deep-rooted popularity. Accordingly, a wood grain pattern is preferred as the pattern of the stainable decorative sheet of the present embodiment. The wood grain pattern includes a straight grain pattern, a flat grain pattern, a burl wood grain pattern, and a butt end pattern, and any of them may be used.

In order to form a decorative layer 50, a resin composition containing at least a binder resin and a colorant such as a pigment and a dye is preferably used, in which other components used as desired such as a matting agent, an extender pigment, a stabilizer, a solvent, and a weather resistant agent such as an ultraviolet absorber and a light stabilizer may be appropriately mixed for use. That is, the decorative layer is a layer containing at least a binder resin and a colorant such as a pigment and a dye, and is also a layer that may contain the above components used as desired.

The binder resin is not particularly limited, and examples of the preferred resin include a urethane resin, an acrylic polyol resin, an acrylic resin, a polyester resin, an alkyd resin, an amide resin, a butyral resin, a styrene resin, a urethane-acrylic copolymer, a vinyl chloride-vinyl acetate copolymer resin, a vinyl chloride-vinyl acetate-acrylic copolymer resin, a nitrocellulose resin (nitrated cotton), and a cellulose acetate resin. Alternatively, for example, a curable resin such as a two-component curable resin including various polyols such as acrylic polyol as main agent and various isocyanates as curing agent may be used. These may be used alone or in combination of two or more.

The colorant for use may be appropriately selected from known ones such as inorganic pigments such as titanium white, white lead, carbon black, iron black, yellow lead, titanium yellow, petals, cadmium red, ultramarine and cobalt blue; organic pigments or dyes such as quinacridone red, isoindolinone yellow, a nickel azo complex and phthalocyanine blue; metal pigments such as flakes of aluminum or brass; and pearl gloss pigments such as flakes of mica coated with titanium dioxide or basic lead carbonate.

Further, from the viewpoint of further improving the design, it is preferable that the decorative layer 50 contain a matting agent as the other component used as desired.

Examples of the matting agent include inorganic fillers such as silica, clay, heavy calcium carbonate, light calcium carbonate, precipitated barium sulfate, calcium silicate, synthetic silicate, and silicic acid fine powder; and organic fillers such as an acrylic resin, a urethane resin, a nylon resin, a polypropylene resin, and a urea-based resin.

When a decorative layer 50 contains a matting agent, the decorative layer has a lower gloss, and therefore it is possible to express a design having a visually rugged pattern due to the difference in gloss.

For example, with respect to the wood grain pattern exemplified as a preferable pattern, the wood grain pattern has conduit portion with lower gloss (matte or low gloss), a spring wood portion with higher gloss (glossy or high gloss), and an autumn wood portion with further higher gloss (shining portion). In the decorative layer 50, combination of a plurality of picture layers 52 such as a picture layer to form a conduit portion with lower gloss, a picture layer to form spring wood portion with higher gloss, and a picture layer to form an autumn wood portion with further higher gloss enables to form a pattern with high designability. Further, in this case, for example, by not containing the matting agent in the overall colored layer 51 or by reducing the content thereof to lower than that of the pattern layer 52, the gloss difference from the pattern layer 52 may be further increased to improve the design.

The thickness of the decorative layer 50 is not particularly limited, preferably 0.1 µm or more, more preferably 0.5 µm or more, still more preferably 1 µm or more, and the upper limit is preferably 10 µm or less, more preferably 9 µm or less, still more preferably 7.5 µm or less from the viewpoint of improving the design. In the case of the decorative layer 50 formed of two or more layers, the total thickness of each layer is preferably in the range.

(Production Method of Stainable Decorative Sheet)

Regarding the method for producing the stainable decorative sheet 1 of the present embodiment will be described taking as an example the stainable decorative sheet 1 shown in FIG. 2 (and FIG. 3), which is one of the preferred embodiments of the stainable decorative sheet 1 of the present embodiment.

The stainable decorative sheet 1 of the present embodiment shown in FIG. 2 (and FIG. 3) may be produced through a step 1 of disposing a decorative layer 50 on a paper base material 10, a step 2 of disposing an adhesive layer 20 on the decorative layer 50, a step 3 of disposing a nonwoven fabric layer 30 and a filling part A31 on the adhesive layer 20, and a step 4 of applying a resin composition for forming a transparency improving layer 40 on the surface of the nonwoven fabric layer 30 so as to form a filling part B33 together with the transparency improving layer 40.

Step 1 is a layer for disposing the decorative layer 50 on the paper base material 10.

The decorative layer 50 is preferably formed from the resin composition used for forming the decorative layer 50 by gravure printing, silk screen printing, gravure offset printing, flexography, ink jet printing, or the like. In the case of a large lot, gravure printing is more preferred, and in the case of a small lot, ink jet printing is more preferred.

The step 2 is a step of disposing the adhesive layer 20 on the decorative layer 50.

For example, a resin composition exemplified as the resin capable of forming the adhesive layer 20 is appropriately selected, and the resin composition preferably containing a urethane resin is applied on the decorative layer 50 to form the adhesive layer 20. In this case, as the method for applying the resin composition, any of the known methods exemplified as the method for applying the resin composition of the decorative layer 50 may be selected.

In this case, from the viewpoint of obtaining excellent adhesion, and from the viewpoint of forming the filling part A31, the filling part B33 and the fiber part 32 in a good balance to improve the stainability and transparency in a good balance, the coating amount (dry base) of the resin composition to form the adhesive layer 20 is preferably 2 $g/m^2$ or more, more preferably 5 $g/m^2$ or more, still more preferably 8 $g/m^2$ or more, and furthermore preferably 10 $g/m^2$ or more, and the upper limit is preferably 50 $g/m^2$ or less, more preferably 45 $g/m^2$ or less, still more preferably 40 $g/m^2$ or less, and furthermore preferably 30 $g/m^2$ or less.

Step 3 is a step of disposing the nonwoven fabric layer 30 and the filling part A31 on the adhesive layer 20.

For example, after applying the resin composition to form the adhesive layer 20, a nonwoven fabric is disposed thereon, and then, dry lamination and thermocompression bonding are preformed, thereby the nonwoven fabric layer 30 is formed, and a part of voids in the nonwoven fabric is filled with the resin composition used for forming the adhesive layer to form the filling part A31.

Alternatively, the nonwoven fabric layer 30 and the filling part A31 may be formed together with the adhesive layer 20.

For example, the resin for the adhesive layer 20 is appropriately selected from those exemplified as the resin capable of forming the adhesive layer 20, preferably a polyolefin resin, and is melt-extruded to dispose the resin to form the adhesive layer, then a nonwoven fabric is disposed thereon and subsequently extrusion lamination (sandwich lamination) is performed, thereby the filling part A31 where a part of voids of the nonwoven fabric is filled with the resin to form the adhesive layer and the nonwoven fabric layer 30 may be formed together with the adhesive layer 20.

In this case, from the viewpoint of obtaining excellent adhesion between the paper base material 10 and the nonwoven fabric layer 30, and the viewpoint of forming the filling part A31, the filling part B33 and the fiber part 32 in a good balance to improve the stainability and transparency in a good balance, the resin to form the adhesive layer has a thickness of preferably 10% or more, more preferably 12% or more, still more preferably 14% or more, with an upper limit of preferably 25% or less, more preferably 23% or less, and still more preferably 20% or less, relative to the thickness of the nonwoven fabric layer 30.

The step 4 is a step of applying a resin composition to form the transparency improving layer 40 on the surface of the nonwoven fabric layer 30, and forming the filling part B33 together with the transparency improving layer 40.

The application of the resin composition to form the transparency improving layer 40 may be performed by any one selected from the known methods exemplified as the method for applying the resin composition of the decorative layer 50. In formation of the transparency improving layer 40, the coating amount of the resin composition may be mainly determined in consideration of the balance of the filling part B33, the fiber part 32 and the filling part A31 in the nonwoven fabric layer 30 in addition to the thickness of the transparency improving layer 40, being usually 1 $g/m^2$ or more, preferably 2 $g/m^2$ or more, more preferably 4 $g/m^2$ or more, the upper limit being preferably 15 $g/m^2$ or less, more preferably 12 $g/m^2$ or less, still more preferably 10 $g/m^2$ or less from the viewpoint of forming the filling part A31, the filling part B33 and the fiber part 32 in a good balance and improving the tactile sensation, sustainability and transparency of the surface in a good balance.

Through the steps described above, a stainable decorative sheet 1 having a preferred aspect shown in FIG. 2, which has the paper base material 10, the decorative layer 50, the adhesive layer 20, the nonwoven fabric layer 30 (filling part A31, the fiber part 32, and the filling part B33) and the transparency improving layer 40 in this order, can be produced.

[Coloring Method of Stainable Decorative Sheet]

The method for coloring the stainable decorative sheet of the present embodiment includes applying a colorant to the transparency improving layer side of the stainable decorative sheet of the present embodiment to color the nonwoven fabric layer.

Since the stainable decorative sheet 1 of the present embodiment has the nonwoven fabric layer 30, the paint receptivity for allowing a colorant such as water-based stain paint and oil-based stain paint to penetrates voids among the fibers is ensured.

Further, the stainable decorative sheet 1 has an adhesive layer 20 between the paper base material 10 and the nonwoven fabric layer 30, and the adhesive layer 20 imparts water resistance and solvent resistance, so that the influence on physical properties of the paper base material 10 can be prevented even when applied to the nonwoven fabric layer 30.

EXAMPLES

In the following, the present invention is more specifically described with reference to Examples, though the present invention is not limited thereto.

(Evaluation Method)

The decorative sheet obtained in each Example or Comparative Example was evaluated as follows.

<Evaluation of Adhesion>

The decorative sheet obtained in each Example or Comparative Example was cut to a size of 300 mm by 300 mm to prepare a test piece for an adhesive strength test. A cellophane adhesive tape having a width of 25 mm (manufactured by Nichiban Co., Ltd., trade name "Cellotape (registered trademark)") was attached to the nonwoven fabric layer side of the test piece and then peeled off to evaluate the adhesion. In the present evaluation, evaluation A is a pass. In the present evaluation and other evaluations, when symbol "+" or "−" added to evaluations A to D, and for example, "B+" indicates that the evaluation is superior to evaluation B but inferior to score A, while, for example, "B−" indicates that the evaluation is inferior to evaluation B but superior to evaluation C.

A: No peeling occurred in the nonwoven fabric layer or between the nonwoven fabric layer and the adhesive layer.

B: Peeling occurred in the nonwoven fabric layer or between the nonwoven fabric layer and the adhesive layer.

<Evaluation on Apparent Transparency>

The appearance of the decorative sheet obtained in each Example and Comparative Example was evaluated based on the following criteria. In the present evaluation, evaluation B or higher are passes.

A: No reduction at all in the apparent transparency was observed, and excellent designability was secured.

B: Almost no reduction in the apparent transparency was observed, no problem was expected in practical use.

C: Reduction in the apparent transparency of the appearance was identified, and designability was lowered.

<Evaluation on Stainability>

An oil-based stain paint was applied to the transparency improving layer side of the decorative sheet obtained in each Example or Comparative Example to evaluate the stainability. In the present evaluation, evaluation A is a pass.

A: Coloring with the oil-based stain paint was excellent, and definitely no or almost no degradation of physical properties of the decorative sheet was identified.

C: The coloring with the oil-based stain paint was good, but due to conspicuous fluffing of the nonwoven fabric fibers, the designability was not excellent.

D: The coloring with the oil-based stain paint was impossible, and/or physical properties of the decorative sheet deteriorated.

(Measurement Method)

<Measurement of Wetting Tension>

In an atmosphere at a temperature of 23° C. (relative humidity: 50%), the resin composition used for forming the layer was applied to a support for measuring wetting tension (thickness: 25 μm, material: PET resin) to form a layer with a coating amount of 8 g/m². Then, onto the layer, application was performed with a wetting tension measuring pen ("tension Checker TC-B-70 (dyne number: 70)", manufactured by Pacific Chemical Co., Ltd.). After 3 seconds, the state of the liquid film was visually checked to see whether the liquid film was torn or shrunk. In the case where no tearing and no shrinkage occur, the wetting tension is 70 mN/m or more.

The wetting tension of the nonwoven fabric to form the nonwoven fabric layer was measured in the same manner as described above except that the wetting tension measuring pen was applied to the surface of the nonwoven fabric.

Example 1

A printing paper sheet ("HPT30 (product number)", manufactured by Hokuetsu Kishu Paper Co., Ltd., thickness: 60 μm, basis weight: 45 g/m²) was prepared as paper base material, and on the printing paper sheet, a decorative layer that exhibits a wood grain pattern (thickness: 2 to 6 μm) was formed by gravure printing using an ink containing a pigment with an acrylic resin as binder resin (an ink containing carbon black as pigment with a binder including a mixture of a vinyl chloride-vinyl acetate copolymer-based resin and an acrylic resin at a mass ratio of 1:1). Subsequently, on the decorative layer, an adhesive layer (thickness: 12 μm) was disposed by gravure printing using a resin composition to form an adhesive layer (urethane resin, main agent: polyester polyol ("Seikabond E-295NTL-D50 (product name)", manufactured by Dainichiseika Color & Chemicals Mfg. Co., Ltd.), and an isocyanate-based curing agent ("Seikabond C-55 (product name)", manufactured by Dainichiseika Color & Chemicals Mfg. Co., Ltd.)) at a coating amount of 12 g/m² (dry base).

Separately, a nonwoven fabric made of rayon fiber ("3016 (product number)", manufactured by Kinsei Seishi Co., Ltd., thickness: 80 μm, basis weight: 17 g/m²) was prepared. The nonwoven fabric and the paper base material having the decorative layer and the adhesive layer were dry-laminated to obtain a laminate having a paper base material, a decorative layer, an adhesive layer, and a nonwoven fabric layer made of a filling part A and a fiber part.

Subsequently, on the fiber part side of the laminate, a resin composition containing a one-component curable acrylic polyol resin as resin for forming a transparency improving layer was applied at a coating amount of 8 g/m² (dry base) to form a filling part B and the transparency improving layer. As a result, a stainable decorative sheet having a paper base material, a decorative layer, an adhesive layer, a nonwoven fabric layer made of a filling part A, a fiber part and a filling part B, and a transparency improving layer was obtained.

Regarding the obtained stainable decorative sheet, the evaluation results by the methods described above are shown in Table 1.

Example 2

A stainable decorative sheet was obtained in the same manner as in Example 1, except that in Example 1, the coating amount for forming the adhesive layer was set to 16 g/m² (dry base) and the coating amount for forming the transparency improving layer was set to 5 g/m² (dry base).

Regarding the obtained stainable decorative sheet, the evaluation results by the methods described above are shown in Table 1.

Example 3

A printing paper sheet ("HPT30 (product number)", manufactured by Hokuetsu Kishu Paper Co., Ltd., thickness: 60 μm, basis weight: 45 g/m²) was prepared as a paper base material, and on the printing paper sheet, a decorative layer that exhibits a wood grain pattern (thickness: 2 to 6 μm) was formed by gravure printing using an ink containing a pigment with an acrylic resin as binder resin (an ink containing carbon black as pigment with a binder including a mixture of a vinyl chloride-vinyl acetate copolymer-based resin and an acrylic resin at a mass ratio of 1:1). Subsequently, on the decorative layer, an adhesive layer (thickness: 5 μm) was disposed by gravure printing using a resin composition to form an adhesive layer (thermoplastic urethane resin, having a wetting tension adjusted to 70 mN/m or more, glass transition temperature: −45° C.) at a coating amount of 5 g/m² (dry base).

Separately, a nonwoven fabric made of rayon fiber ("3016 (product number)", manufactured by Kinsei Seishi Co., Ltd., thickness: 80 μm, basis weight: 17 g/m²) was prepared. The nonwoven fabric and the paper base material having the decorative layer and the adhesive layer were dry-laminated to obtain a laminate having a paper base material, a decorative layer, an adhesive layer, and a nonwoven fabric layer made of a filling part A and a fiber part.

Subsequently, on the fiber part side of the laminate, a resin composition containing 100 parts by mass of an acrylic polyol resin (hydroxyl number: 41 mg KOH/g) and 5 parts by mass of an isocyanate-based curing agent (hexamethylene diisocyanate, isocyanate group content: 19 mass %) as resin composition for forming a transparency improving layer was applied at a coating amount of 12 g/m² (dry base) to form a filling part B and the transparency improving layer. As a result, a stainable decorative sheet having a paper base material, a decorative layer, an adhesive layer, a nonwoven fabric layer made of a filling part A, a fiber part and a filling part B, and a transparency improving layer was obtained.

Regarding the obtained stainable decorative sheet, the evaluation results by the methods described above are shown in Table 1.

Any of the wetting tensions of the resin composition that forms the adhesive layer, the resin composition that forms the transparency improving layer and the nonwoven fabric measured by the method described above was 70 mN/m or more.

Comparative Example 1

A decorative sheet was obtained in the same manner as in Example 2, except that in Example 2, the coating amount for forming the adhesive layer was 24 g/m$^2$ (dry base).

Regarding the obtained stainable decorative sheet, the evaluation results by the methods described above are shown in Table 1.

TABLE 1

|  | Example | | | Comparative |
| --- | --- | --- | --- | --- |
|  | 1 | 2 | 3 | Example 1 |
| Adhesion | A | A | A$^-$ | C |
| Transparency | A | A | A | B |
| Stainability | A | A | A$^+$ | C |

From the results in Examples, it was confirmed that the stainable decorative sheet in the present embodiment is excellent in all of the adhesion, transparency and stainability. Further, in Example 3, by using a thermoplastic urethane resin for the adhesive layer, the stainability was improved, though the adhesion was slightly lowered as compared with those in Examples 1 and 2.

On the other hand, in the decorative sheet of Comparative Example 1, the entire nonwoven fabric layer was filled with the resin of the adhesive layer, so that no stainability was exhibited.

INDUSTRIAL APPLICABILITY

The stainable decorative sheet of the present embodiment has good adhesion between the paper base material and the nonwoven fabric, with good surface tactile sensation and stainability, having excellent transparency. Accordingly, the stainable decorative sheet may be suitably used as a layer that constitutes interior or exterior materials of buildings such as a wall, a ceiling and a floor, fittings and construction members such as a window frame, a door, a handrail, a skirting board, a crown molding and a braid, as well as a surface decorative board of kitchen equipment, furniture or a cabinet of light electric equipment and OA equipment, and a member for an interior or exterior member of vehicles.

REFERENCE SIGNS LIST

1: stainable decorative sheet
10: paper base material
20: adhesive layer
30: nonwoven fabric layer
31, 33: filling part
32: fiber part
40: transparency improving layer
50: picture layer

The invention claimed is:

1. A stainable decorative sheet comprising:
a paper base material,
an adhesive layer formed of a resin and disposed on at least one surface side of the paper base material,
a nonwoven fabric layer disposed on a surface side of the adhesive layer other than the surface on which the paper base material is disposed, and
a transparency improving layer formed of a resin and disposed on a surface side of the nonwoven fabric layer other than the surface on which the adhesive layer is disposed,
wherein the nonwoven fabric layer partially has a filling area A, in which a part of voids of fibers constituting the nonwoven fabric layer is filled with the resin forming the adhesive layer on the side where the adhesive layer is provided in the thickness direction of the nonwoven fabric layer, and a filling area B, in which a part of the voids of the fibers constituting the nonwoven fabric layer is filled with the resin forming the transparency improving layer on the side where the transparency improving layer is provided in the thickness direction of the nonwoven fabric layer,
wherein the nonwoven fabric layer is a single nonwoven fabric layer,
wherein the resin forming the adhesive layer contains a urethane resin, and
wherein a wetting tension of the urethane resin in the adhesive layer is 70 mN/m or more.

2. The stainable decorative sheet according to claim 1, wherein the nonwoven fabric layer is made of at least one fiber selected from a thermoplastic resin fiber and a regenerated fiber.

3. The stainable decorative sheet according to claim 1, wherein the resin forming the transparency improving layer is at least one resin selected from an acrylic resin, an acrylic polyol resin and a urethane resin.

4. The stainable decorative sheet according to claim 1, further comprising a decorative layer between the paper base material and the adhesive layer.

5. The stainable decorative sheet according to claim 4, wherein the decorative layer exhibits a wood grain pattern.

6. The stainable decorative sheet according to claim 1, wherein the urethane resin is a thermoplastic resin.

7. The stainable decorative sheet according to claim 1, wherein the urethane resin is a curable resin.

8. The stainable decorative sheet according to claim 1, wherein a thickness of the single nonwoven fabric layer is 30 µm or more and 200 µm or less.

9. The stainable decorative sheet according to claim 1, wherein a wetting tension of the resin in the transparency improving layer is 70 mN/m or more.

10. A method for coloring a decorative sheet, comprising applying a colorant to the transparency improving layer side of the stainable decorative sheet according to claim 1 to color the nonwoven fabric layer.

* * * * *